Jan. 18, 1966 W. A. BAKER 3,229,649
AIR RAID SHELTER
Filed Oct. 10, 1962 3 Sheets-Sheet 3
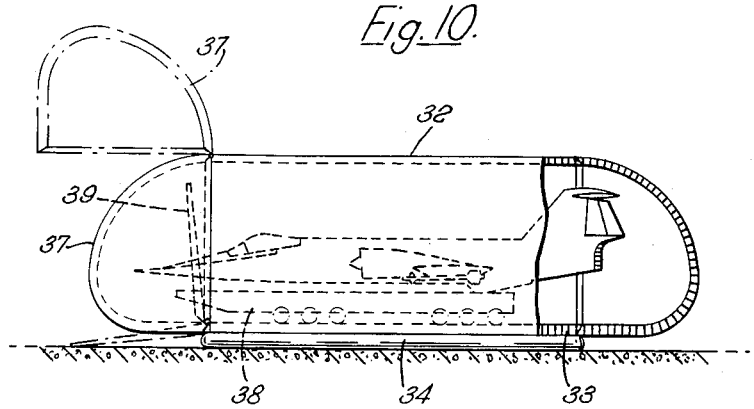
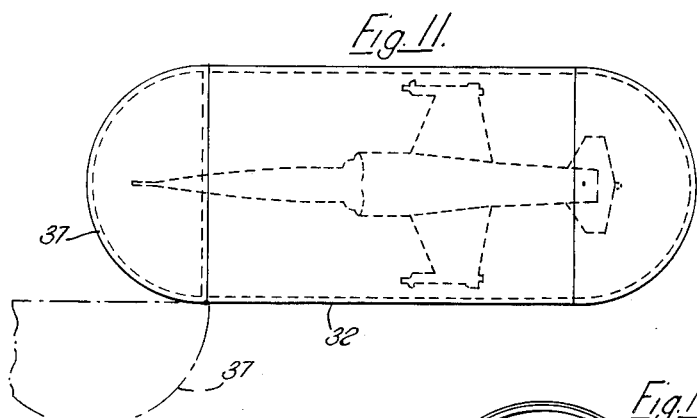
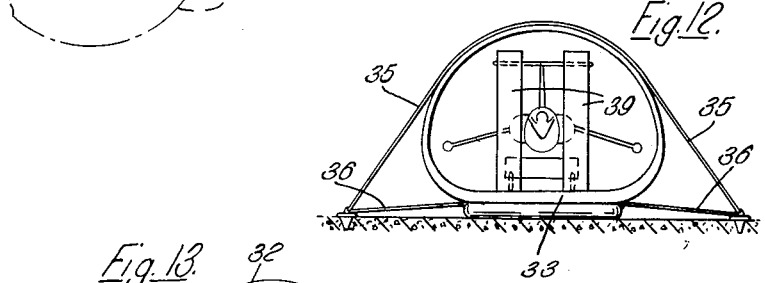
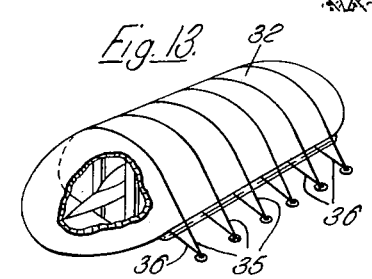
Inventor
William Andrew Baker
By
Bailey, Stephens & Huettig
Attorneys nited States Patent Office 3,229,649
Patented Jan. 18, 1966

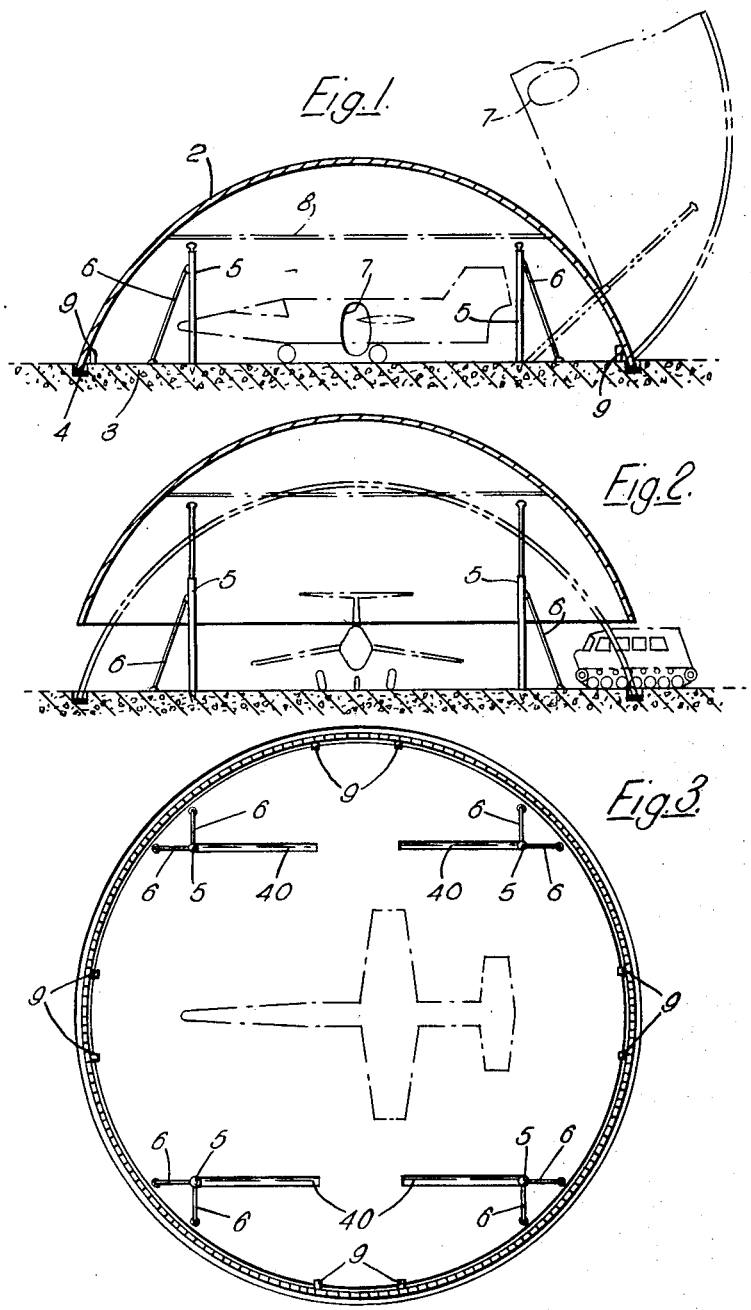

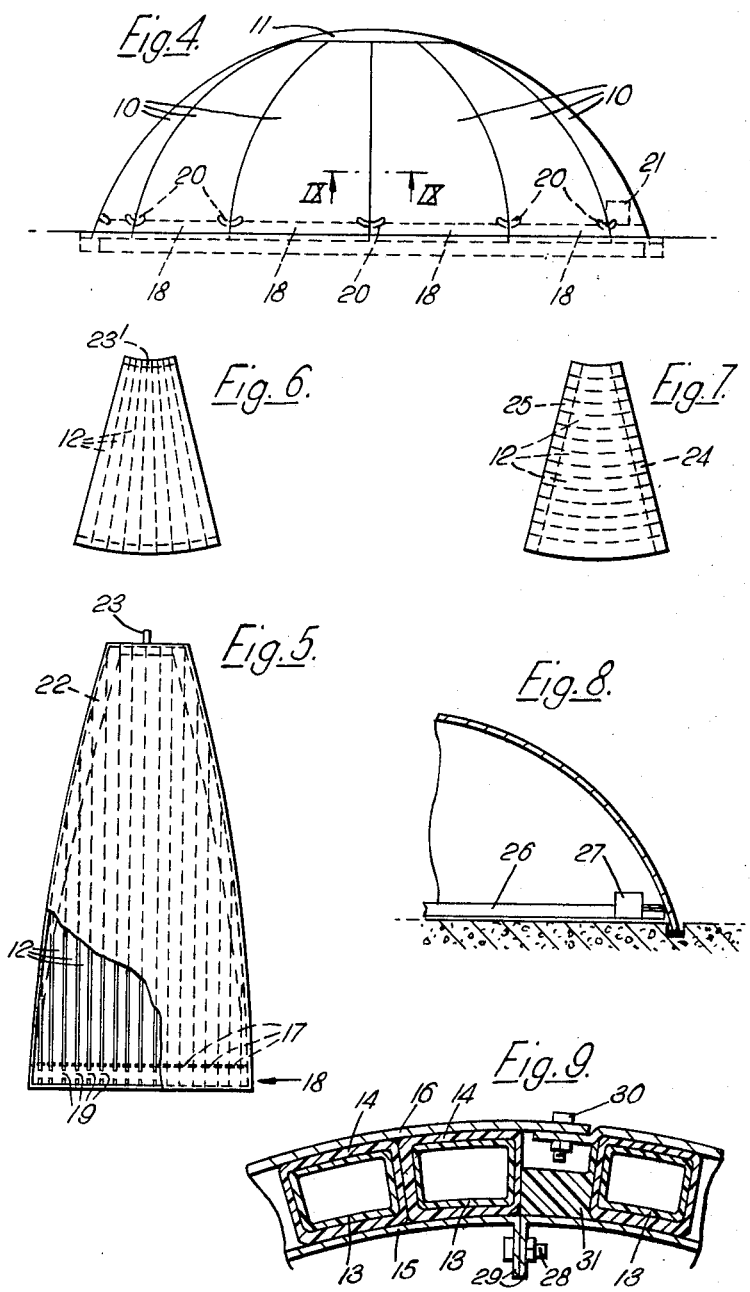

3,229,649
AIR RAID SHELTER
William Andrew Baker, Bristol, England, assignor to Bristol Aeroplane Plastics Limited, Bristol, England, a British company
Filed Oct. 10, 1962, Ser. No. 229,699
Claims priority, application Great Britain, Oct. 11, 1961, 36,513/61; June 27, 1962, 24,750/62
4 Claims. (Cl. 109—1)

The present invention is concerned with air raid shelters for providing shelter against the effects of distant explosions and particularly nuclear explosions. In particular it is concerned with shelters which can be used to shelter aircraft, aircraft personnel, stores and other equipment. One of the main effects of a distant explosion is an air blast, which may cause a large rise in pressure, for example up to 27 p.s.i. for a 1 megaton bomb at 1.5 miles. Other effects against which a shelter should be capable of giving protection are thermal, radiation, electric and seismic effects, in the case of nuclear attack, and also flying debris and small arms fire.

A shelter according to the present invention comprises a shell formed by one or more mouldings, each moulding consisting of spaced skins of resin-bonded fibrous material connected by webs bridging the gap between the skins.

The shell preferably has no sharp corners and is preferably convex all over as viewed from outside, except for the bottom, which may be flat. The thickness of the wall of the shell may be substantially constant. Alternatively it may be varied as required to suit particular loading conditions, for example from wall attachments.

There is preferably provision for filling the gap between the skins with water after the shelter has been assembled. The water increases the protection which the shelter will give against nuclear radiation, but it can be drained away so that the shelter can be easily transported when necessary.

The wall of the shell may include a metal mesh to screen equipment inside the shelter from the effect of electric and magnetic disturbances which arise from nuclear explosions. In addition the external surfaces may be coated with a material of low thermal conductivity or may be given a reflective finish to reduce the effect of radiated heat, or may have both.

In one preferred form of shelter according to the present invention the shell is dome-shaped, for example approximately hemispherical, without an integral base. The shell rests on a base from which it is lifted by one or more jacks whenever anything large such as an aircraft or vehicle is required to be moved into or out of the shelter. The base may be formed by any hard surface, for example concrete.

Examples of shelters according to the present invention are shown in the accompanying drawings. In these drawings:

FIGURE 1 is a vertical section of one shelter;
FIGURE 2 shows the shelter in a raised position;
FIGURE 3 is a sectional plan view of the shelter;
FIGURE 4 shows how the shell of the shelter is built up from segments;
FIGURE 5 is a partly sectioned view of one segment of the shell;
FIGURE 6 shows a segment of a different construction;
FIGURE 7 shows another different construction for the segment;
FIGURE 8 is a fragmentary vertical section of a slightly modified shelter;
FIGURE 9 is a fragmentary sectional view much enlarged on the line IX—IX in FIGURE 4;
FIGURE 10 is a partly sectioned side view of a different shelter;
FIGURE 11 is a plan view of the shelter shown in FIGURE 10;
FIGURE 12 is a view from the left of FIGURE 10 with the door of the shelter removed so as to show the positioning of an aircraft; and
FIGURE 13 is a partly sectioned perspective view of the shelter shown in FIGURE 10.

The shelter shown in FIGURE 1 consists basically of a dome-shaped shell 2 which rests on a concrete base 3, the edge of the shell being accommodated in a circular channel at the bottom of which there is a flexible seal 4. When the shelter is being used to provide protection against the effects of explosion, the shell is pulled down firmly onto the seal by four vertical jacks 5 which are operated by fluid pressure. The jacks 5 are each supported by two struts 6.

The shelter has one or more elliptical doors 7 (see FIGURE 1) just above the bottom edge to permit personnel to enter and leave the shelter without the need for raising the whole shell. Inside the shell there is a horizontal floor 8 forming a compartment in which personnel may be accommodated; alternatively or adidtionally, the shelter may be large enough to receive one or more large vehicles which can be used both to move aircraft into and out of the shelter and to accommodate personnel.

FIGURE 2 shows how the shell may be raised by means of the four jacks 5 to provide access of limited height into the shelter. For aircraft take-off the struts 6 are disconnected and the shell is connected to the base by means of one of four pairs of hinges 9, after which the shell is swung upwards by means of the two jacks nearest the hinges, as shown in broken lines in FIGURE 1. The shell can be raised by means of any pair of adjacent jacks by pivotally connecting it to the base through the appropriate pair of hinges 9. The fact that the shell can be raised about any one of the four pairs of hinges 9 means that there is little chance of the raising of the shell being altogether prevented by debris deposited by an explosion.

As shown in FIGURE 1, the jacks are capable of raising the shell through an angle of up to 65° so as to make possible a nearly vertical take-off of an aircraft from its initial position on the base under the shell, and to allow an aircraft at the center of the shell to be withdrawn from the shell along varying paths lying within a range of at least 180°. Provision may further be made for rolling the shell right over onto its back so as to be completely clear of the aircraft; this may be achieved by means of explosive charges in the jacks.

The four pairs of hinges 9 include clamping devices (not shown) to assist in securing the shell to the base when it is not required to be in a raised position. Each pair of hinges 9 forms a hinge joint, the perpendicular bisector of which is a line perpendicular to the axes of the two hinges forming the joint and spaced half-way between them.

The shell 2 may in general be formed by any convenient number of mouldings secured together on the site. FIGURE 4 shows a preferred construction in which the shell is formed by a number of similar segments 10 with a circular top piece 11.

Each segment 10 of the shell is formed by a number of tubes 12 (FIGURE 5) each of which is formed by an inner tube 13 (FIGURE 9) of a thermoplastic material such as polyvinyl chloride around which is wound a layer of glass fibre 14 impregnated with resin to constitute an outer tube. The tubes are side by side and are connected by inner and outer skins 15 and 16 consisting of woven glass fibre sheets impregnated with resin which bonds the skins to the tubes. Parts of the walls of the tubes form webs bridging the gap between the skins. Near the lower ends of the tubes 12 there are transverse webs 17 which form a manifold 18 running along the bottom edge of the segment, the walls of the tubes being formed with openings 19. When the shell is assembled, the manifolds 18 of the segments are connected by pipes 20 (FIGURE 4) so that water pumped into the manifolds via a pump 21 will pass into the tubes of all the segments. During the pumping in of water, air is expelled from the tubes into a manifold 22 running along the top edge and along the sides of the segment and communicating with all the tubes. Air is discharged from the manifold 22 through an outlet 23. Alternatively, if it is desired to circulate the water, the outlet 23 may be connected to the inlet of the pump 21.

Instead of being connected by pipes 20, the manifolds along the bottom edges of the segments may be in communication with one another through sealed joints at the ends of the manifolds.

As an alternative to the construction shown in FIGURE 5, each segment may be formed in the manner shown in FIGURE 6, in which the tubes 12 taper towards their upper ends and communicate with a manifold 23 extending only along the upper edge of the segment. A further alternative is shown in FIGURE 7, in which the tubes 12 are horizontal, with an inlet manifold 24 extending along one edge of the segment, and an outlet manifold 25 extending along the other edge of the segment.

The top piece 11 is formed by spaced upper and lower skins of resin-bonded fibrous material connected by webs. As an alternative to the construction shown in the drawings the segments 10 may be continued to the top of the shell so that no top piece is needed.

As an alternative to a construction in which the inlet manifold 18 is formed within each segment, there may be a circular manifold 26 which extends all the way round the lower edge of the shell, as shown in FIGURE 8. The manifold 26 would then have outlets leading to all the individual tubes 12 of the segments. Water is delivered to the manifold 26 by a pump 27.

As shown in FIGURE 9, the segments are joined by bolts 28 which clamp together inwardly directed flanges 29 at the edges of adjacent inner skins 15 of the segments. In addition there are bolts 30 which clamp together overlapping portions of the outer skins 16, but these may be omitted. Between the edges of the segments there is a block of resin 31 which is moulded onto the segment shown on the right-hand side of FIGURE 9.

After the shell has been assembled and filled with water, the outlets 23 at the tops of the segments are closed. When it is required to raise the shelter, water is pumped out of the segments through the vents 23 into a reservoir from which water can later be drawn by the pump to refill the wall of the shell with water.

The outer surface of the shell is coated with a heat-resistant layer (not shown) consisting of asbestos impregnated with a phenolic resin. A suitable material is that sold under the trade name "Durestos." Alternatively or additionally an external layer of heat reflecting material (which may be metal) may be sprayed or painted on, or it may be applied in the form of a foil.

Facilities for ventilation, telephone, water and drainage are built into the base. The base also includes channels 40 (see FIGURE 3) into which the jacks can be lowered when not in use.

In order to increase resistance to seismic effects, the base may be mounted on a layer of rigid foamed plastic.

The jacks 5 may be made of a corrosion-resistant plastic, for example resin-bonded windings of glass fibre.

The shelter shown in FIGURES 10 to 13 includes a shell 32 which has an integral bottom 33 formed, similarly to the remainder of the shell, by spaced skins of resin-bonded fibrous material connected by webs bridging the gap between the skins. The shell is mounted on a cushion 34. This cushion may be formed by spaced horizontal skins of resin-bonded fibrous material sandwiching between them a thick sheet of foamed plastic or any other cushioning material.

During use the shell is held down firmly on the cushion by wire ropes 35 passing over the top of the shell and anchored to the ground, and by ropes 36 secured to the bottom of the shell and anchored to the ground. There may in addition be ropes (not shown) which secure the cushion to the ground. The ropes may include tensioners, for example automatically loaded spring tensioners (not shown), to avoid any slack occurring in the event of the cushion being permanently deformed.

The shell includes a hinged door 37 controlled by one or more mechanical rams (not shown) operated from inside the shell. The door may form a seal with the remainder of the shell simply by abutting against a tapered seat on the shell. The door may be hinged about a horizontal axis so as to swing upwards when opening, as shown in FIGURE 10, or about a vertical axis so as to swing sideways when opening, as shown in FIGURE 11. The floor of the shell may have a metal surface to distribute the load from the wheels of an aircraft launching trolley 38. Two narrow ramps 39, one for each of two sets of wheels at the sides of the trolley, are pivoted to the bottom edge of the door opening and can be swung down to the ground from vertical positions (shown in FIGURE 12) in which they lie on opposite sides of the nose of the aircraft when the aircraft is in the shelter.

The shell may be formed by any number of mouldings which may, for example, be secured together by bolts passing through abutting inwardly directed flanges at the edges of the mouldings, as shown in FIGURE 9. For example, the main part of the shell, which is of uniform cross-section, may be formed as one piece, and the right-hand end portion as seen in FIGURE 10 may be formed as a separate piece. In this case the main portion may be made by winding thread around a mandrel to form the inner skin, then applying web-forming parts around the winding, and finally winding on further thread to form the outer skin. The thread may be impregnated with resin either before or after the winding operation. Webs may be formed by wrapping sheets of woven fibre around blocks, applying the blocks to the inner winding and then adding the outer winding, so that webs are formed by the parts of the sheets extending between the two windings; the sheets are in this case also impregnated with resin. The blocks may be of a wax or other material which melts when heat is applied to cure the resin, so that the material of the blocks can be drawn out as a liquid to leave ducts for water. Alternatively, if it is not required to increase the weight of the shelter by means of water, after assembly of the structure the blocks may remain in position between the skins, in which case they may be of foamed plastic.

As an alternative to the shell construction described above, the shell may be split at longitudinal sections or at longitudinal and transverse sections so that it is made of a number of easily transportable parts.

The shell shown in FIGURE 1 may have a diameter of about 53 feet.

The shell shown in FIGURE 10 may have a total length of about 47 feet.

In order to prevent serious damage being done to the shelter during the brief but intense period of heat radiation from a nuclear explosion, the outer surface of the shell is preferably covered by a heat resistant layer consisting of asbestos impregnated with phenolic resin and alternatively or additionally by a heat-reflecting surface, which may be of metal. This may be sprayed or painted on, or it may be applied in the form of a foil.

I claim:

1. An air raid shelter for protecting aircraft and other vehicles against nuclear explosions, comprising a relatively light-weight dome-shaped shell and a separately formed base on which the shell rests, the said shell comprising spaced skins of resin-bonded fibrous material and connecting webs bridging the space between the skins, said skins and webs defining compartments for water for providing a heavy wall section of substantial thickness extending over the entire shell, and including manifold means for filling the said compartments with water when the shell is on the base, and for emptying out the water when necessary, a horizontal hinge joint pivoting the said shell to the base at the periphery to turn about an axis fixed with respect to the base, and two jacks lying near the hinge joint on opposite sides of a perpendicular bisector of the hinge joint connecting the shell to the base, said jacks being powered for swinging the shelter upwards about the hinge joint after the water has been drained out the shell.

2. A shelter according to claim 1 in which the shell is formed by a number of tapering segments bolted together.

3. An aircraft air raid shelter comprising a dome-shaped shell comprising spaced skins of resin-bonded fibrous material and webs bridging the space between the skins, a separately formed base on which the shell rests, a horizontal hinge joint pivoting the shell to the base at the periphery of the shell, and two jacks connected to the base and connected to the shell at points lying close to the periphery of the shell on opposite sides of a perpendicular bisector of the hinge joint, the said jacks being situated close to the periphery of the shell at points lying between the hinge joint and a diametral line of the shell parallel to the hinge axis for swinging the shell upwards by their own power to a height sufficient to allow an aircraft at the centre of the shell to be withdrawn from the shell along various paths lying within a range of at least 180°.

4. In an aircraft air raid shelter according to claim 3, means including a manifold for filling the space between the skins of the shell with water.

References Cited by the Examiner

UNITED STATES PATENTS

| | | | |
|---|---|---|---|
| 1,709,701 | 4/1929 | Althoff | 244—135 |
| 2,112,348 | 3/1938 | Rutten | 50—52 |
| 2,397,184 | 3/1946 | Klose | 244—135 |
| 2,773,459 | 12/1956 | Sechy | 109—1 |
| 2,792,794 | 5/1957 | Miller | 109—1 |
| 2,830,606 | 4/1958 | Daugherty | 135—1 |
| 2,837,101 | 6/1958 | Bary | 135—1 |
| 2,897,668 | 8/1959 | Graham | 109—1 |
| 2,990,837 | 7/1961 | Cushman | 135—1 |

FOREIGN PATENTS 866,229   4/1961   Great Britain.

HARRISON R. MOSELEY, *Primary Examiner.*

C. S. KAIMAN, L. J. SANTISI, *Assistant Examiners.*